United States Patent [19]

Baumgarten et al.

[11] Patent Number: 4,987,793

[45] Date of Patent: Jan. 29, 1991

[54] CABLE CONTROL SYSTEM WITH ADJUSTMENT DEVICE

[75] Inventors: John M. Baumgarten, West Bloomfield; Adam W. Chaczyk, Sterling Heights, both of Mich.

[73] Assignee: Babcock Industries, Inc., Fairfield, Conn.

[21] Appl. No.: 460,809

[22] Filed: Jan. 4, 1990

[51] Int. Cl.⁵ .............................................. F16C 1/10
[52] U.S. Cl. ................... 74/502; 74/501.5 R; 188/196 D
[58] Field of Search ............ 74/500.5, 501.5 R, 501.6, 74/502.1–502.6; 192/111 A, 70.25, 30 W; 188/196 B, 2 D, 196 D

[56] References Cited

U.S. PATENT DOCUMENTS

| | | | |
|---|---|---|---|
| 2,026,459 | 12/1935 | Caretta | 74/502 |
| 3,393,578 | 7/1968 | Tschanz | 74/502 |
| 4,570,506 | 2/1986 | Yamamoto et al. | 74/501.5 R |
| 4,588,052 | 5/1986 | Courbot | 192/111 A |
| 4,669,330 | 6/1987 | Stocker | 74/501.5 R |
| 4,694,706 | 9/1987 | Lichtenberg | 74/501.5 R |
| 4,821,593 | 4/1989 | Kobylarz | 74/501.5 R X |
| 4,829,845 | 5/1989 | Suzuki | 74/502.4 |
| 4,854,185 | 8/1989 | Lichtenberg et al. | 74/502 X |
| 4,869,123 | 9/1989 | Stocker | 74/501.5 R |

FOREIGN PATENT DOCUMENTS 653424 5/1951 United Kingdom .................. 74/502

Primary Examiner—Vinh T. Luong
Attorney, Agent, or Firm—Barnes, Kisselle, Raisch, Choate, Whittemore & Hulbert

[57] ABSTRACT

A cable control system including an adjustment device comprising a housing, a conduit fitting member mounted for reciprocating movement within the housing and adapted to be connected to the conduit of a cable system through which a cable strand extends. A spring yieldingly urges the housing in one direction. A ratchet gear is rotatably mounted in the housing and supports a pinion gear which engages teeth on the conduit fitting member. The ratchet gear has teeth with a pitch diameter greater than the pitch diameter of the teeth on the pinion gear and the teeth on the pinion gear are larger than the teeth on the ratchet wheel so that there are a greater number of teeth on the ratchet wheel than on the pinion. A removable ratchet detent engages the teeth on the ratchet wheel. In one form, the device automatically adjusts to change the tension on the cable conduit. In another form, the device is unlocked to provide an adjustment.

10 Claims, 3 Drawing Sheets

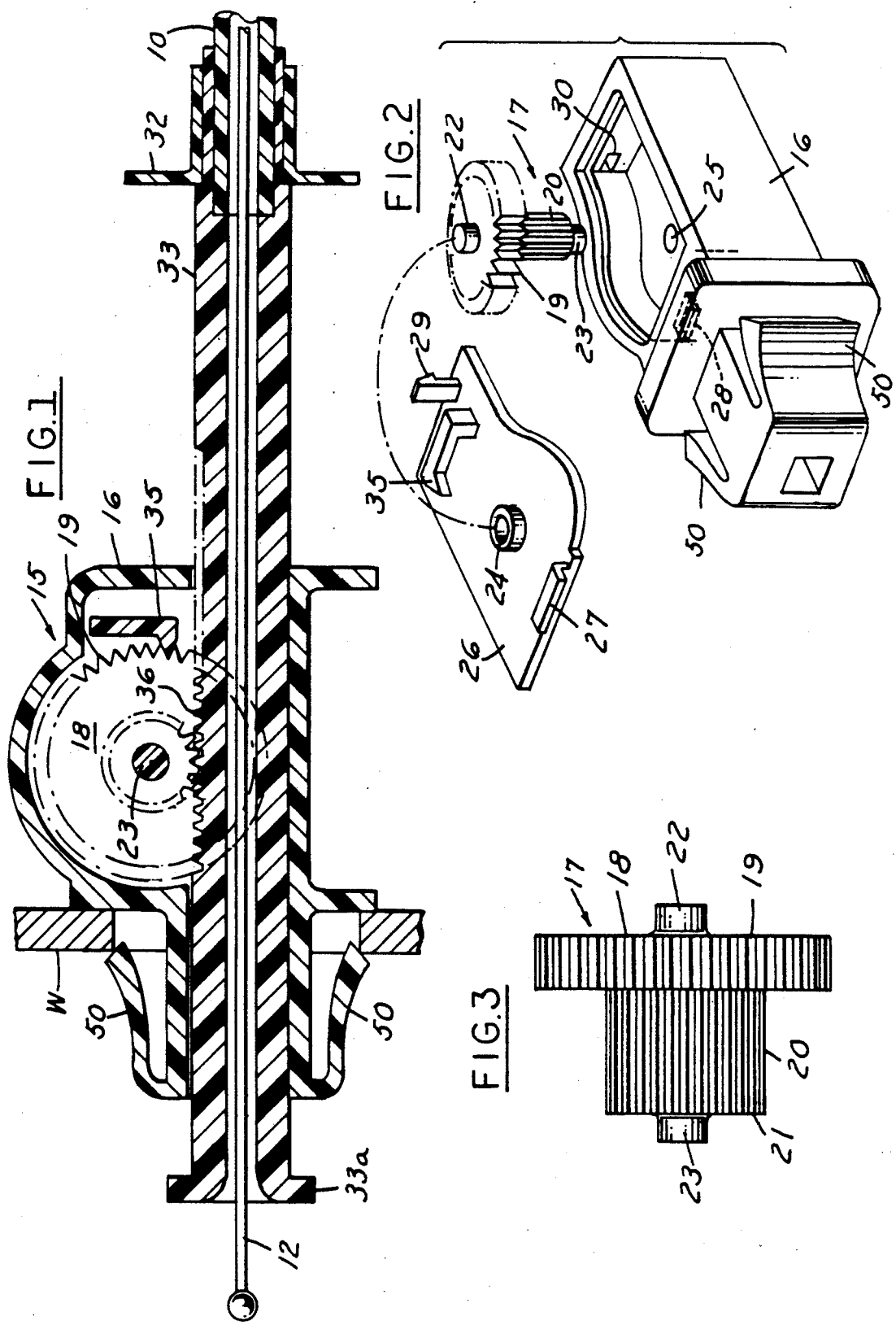

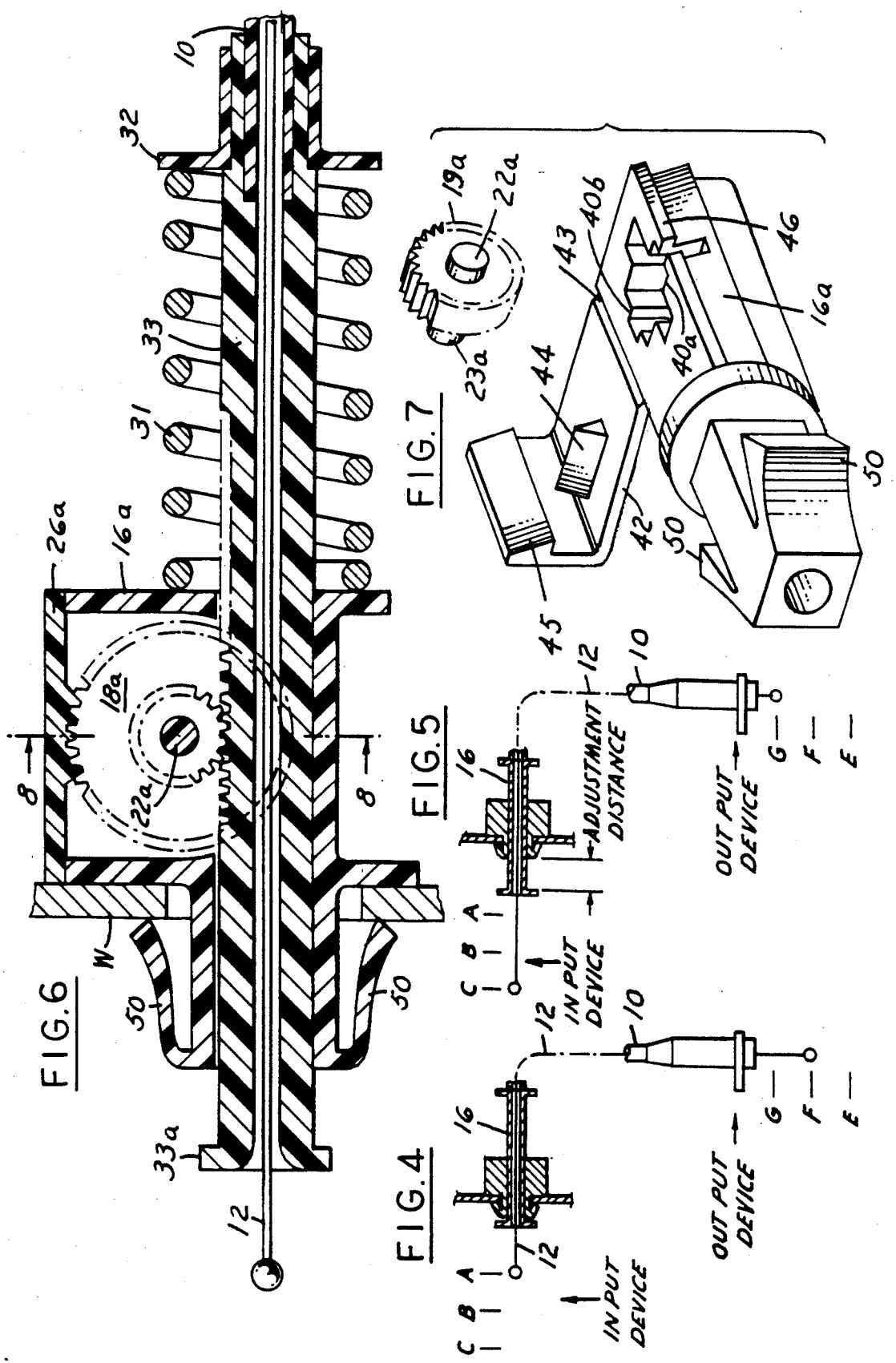

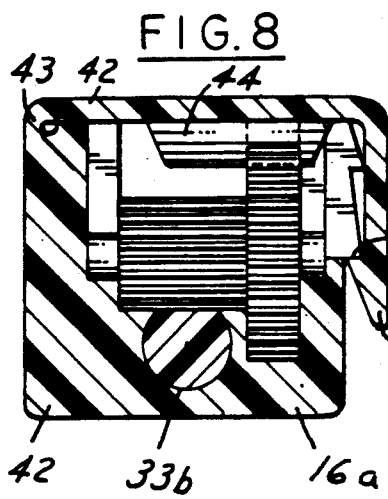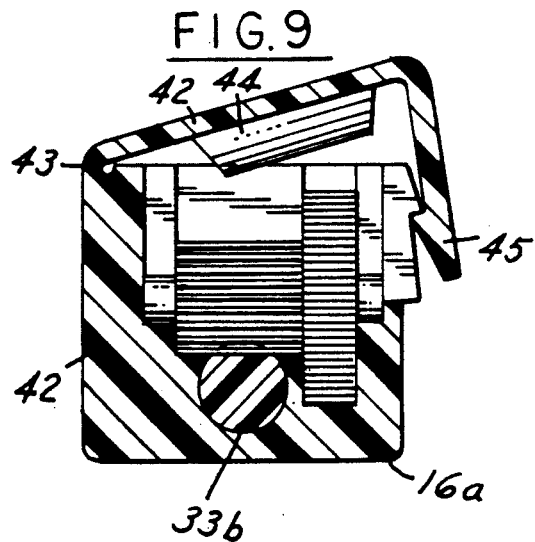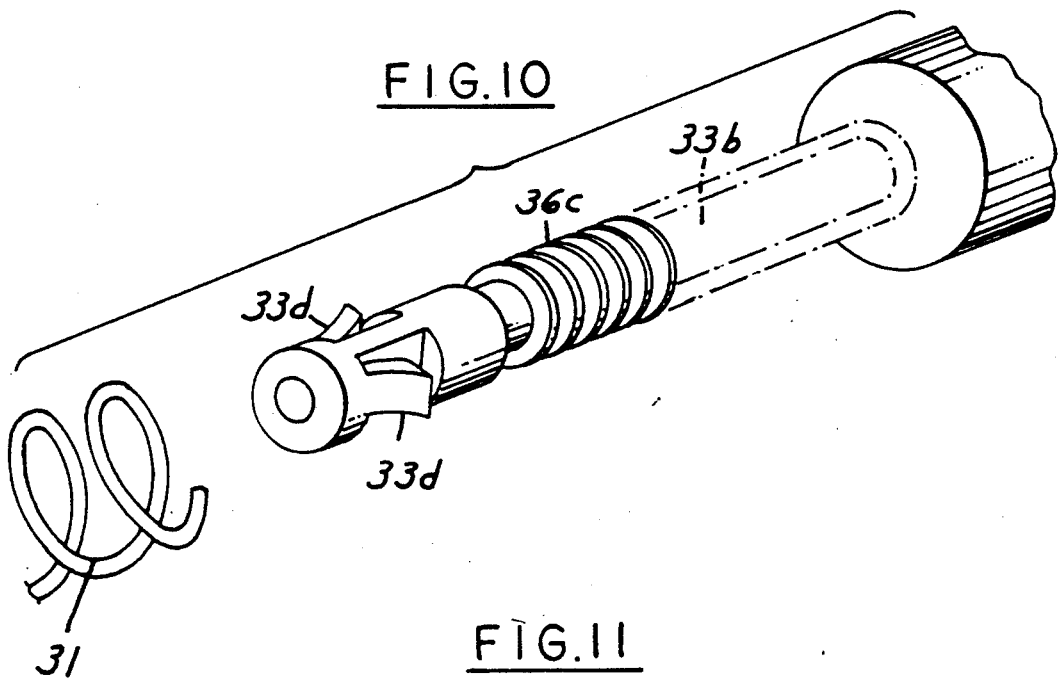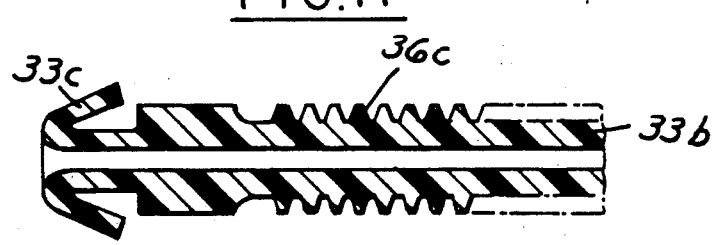

CABLE CONTROL SYSTEM WITH ADJUSTMENT DEVICE

This invention relates to cable control systems and to devices for automatically controlling the tension in cable control systems.

FIELD OF THE INVENTION

In cable control systems such as used in automotive vehicles and the like it is common to provide a device for changing the tension on the conduit which, in turn, controls the tension on the cable strand of the cable control system.

DESCRIPTION OF THE PRIOR ART

Typical devices are shown, for example, in U.S. Pat. No. 4,669,330 and 4,829,845 and EPO Patent No. 0221627A1. In such devices, ratchet teeth engage a conduit fitting member which is yieldingly urged to apply a force on the conduit and in turn change the tension on the cable. In such devices, the increment of adjustment is determined by the ability to make the teeth smaller. When the devices are made of plastic, factors, such as plastic warpage shrinkage, flash, mismatch and strength of core and cavity of the molded part, limit the size of the teeth which may be molded to a size on the order of one millimeter.

SUMARY OF THE INVENTION

Among the objectives of the present invention are to provide a cable control system incorporating a device which will produce substantially smaller adjustment while the teeth are large enough to be accurately molded; wherein the device will withstand higher compression loads because the teeth are larger; and which can be automatically or manually controlled.

In accordance with the invention, the cable control system includes an adjustment device comprising a housing, a conduit fitting member mounted for reciprocating movement within the housing and adapted to be connected to the conduit of a cable system through which a cable strand extends. A spring yieldingly urges the device in one direction. A ratchet gear is rotatably mounted in the housing and supports a pinion gear which engages teeth on the conduit fitting member. The ratchet gear has teeth with a pitch diameter greater than the pitch diameter of the teeth on the pinion gear and the teeth on the pinion gear are larger than the teeth on the ratchet wheel so that there are a greater number of teeth on the ratchet wheel then on the pinion. A retractable ratchet detent engages the teeth on the ratchet wheel. In one form, the device automatically adjusts to change the tension on the cable conduit. In another form, the device is unlocked to provide an adjustment.

DESCRIPTION OF THE DRAWINGS

FIG. 1 is a fragmentary longitudinal sectional view of a cable control system incorporating the invention.

FIG. 2 is an exploded view of a portion of the system.

FIG. 3 is a side elevational view of a combined ratchet gear and pin utilized in the device.

FIG. 4 is a diagramatic view of the functioning of the device shown in FIGS. 1–3. FIG. 5 is a diagramatic view showing the functioning of the device shown in FIGS. 7–9.

FIG. 6 is a longitudinal sectional view of a modified form of system.

FIG. 7 is an exploded view of a portion of the system shown in FIG. 6.

FIG. 8 is a sectional view taken along the line 8—8 in FIG. 6 showing the device in one position.

FIG. 9 is a view similar to FIG. 8 showing the device in a locked position.

FIG. 10 is a fragmentary exploded view of a modified form of a portion of the device shown in FIGS. 6–9.

FIG. 11 is a longitudinal sectional view of a portion of the device show in FIG. 10.

DESCRIPTION

Referring to FIGS. 1–6, a portion of the cable control system is shown which includes a cable that comprises a cable conduit 10 and flexible cable strand 12. It is desirable to be able to change the relationships between the conduit and the strand to maintain tension in the strand even though the cable is moved in a circuitous path. It is also desirable to maintain a certain predetermined dimension between the end of the strand 12 and a fixed wall or bracket W on which the device is mounted.

In accordance the the invention, a device 15 for providing automatic adjustment includes a plastic housing 16 in which a combined ratchet gear and pinion gear 17 is rotatably mounted. The combined gear 17 comprises a ratchet wheel or gear 18 having teeth 19 and a pinion gear 20 having teeth 21. Bosses 22, 23 form the shaft and are adapted to engage openings 24, 25 in a cover 26, and housing 27 to rotatably mount the wheel 17 in position. The cover 26 is provided with an integral hook 27 that is adapted to engage in a slot 28 in housing 16 at one end and a latch 29 at the other end that is adapted to extend beneath a ledge 30 at the other end. A flange member 32 is fixed to a member 33 after the member 33 is inserted in housing 16 such that is reciprocably mounted in the housing 16 and is attached to the conduit 10. Flange 33a on the other end of member 33 functions to limit the movement and prevent the member 33 from being removed from the housing 16.

A lock or spring ratchet 35 is integrally formed in the cover 26 and engages a tooth of the ratchet gear 18. The teeth 21 of the pinion gear engage teeth 36 that are spaced longitudinally along the length of the member 33.

Referring to FIG. 4 which is a diagram of a typical system in which the device 15 can be used, the components are first assembled at the cable manufacturing operation. The housing 16 is provided in the forwardmost position of the rack 36 for assembly in a vehicle. The device can then be used to take up length differences normally found in automotive systems. These differences are usually adjusted by hand resulting in a very labor intensive operation. If the system is not adjustable, slack in the cable or deformation of the mounting brackets can occur. In a typical arrangement, it may be desired that an output device be at a position G when the input device is at a position C. G may be, for example, the endmost position of a control device, known as a dead stop and C may be the end of the input device stroke. When the input device is moved to position B, it is desired that the output device be at G. The input device could further move to a position C during the time that the output device stays at a position G. This movement would be taken up by the mechanism automatically by a ratcheting action between the ratchet 35 and the teeth of the ratches gear 18. Such an arrangement is automatic similar to that shown in U.S Pat. No. 4,694,706, incorporated herein by reference.

Placing the cover 26 back on housing locks the member 33 in the adjusted position.

The diameter and number of teeth on the ratchet gear 18 is greater than the number of teeth on the pinion gear 20. Further the pitch diameter of teeth 21 on the pinion gear 20 is greater than the pitch diameter of the teeth 19 on the ratchet wheel 18, as a result, the teeth 19 on the ratchet wheel 18 can be made smaller than the teeth 21 on pinion gear 20 permitting a smaller adjustment by predetermined movement thereof.

The adjustment increment is related to the circumference of the pinion pitch diameter and the number of teeth in the ratchet wheel by the following relationship:

$$\text{adjustment increment} = \frac{\text{circumference of pitch diameter of pinion gear}}{\text{number of teeth on ratchet gear}}$$

For example, if the pinion gear has a pitch of 48, that is having teeth larger than one millimeter and if the pitch diameter is 8.45 millimeters resulting in 16 teeth, the circumference of the pitch diameter is 26.6 millimeters. The ratchet wheel, on the other hand may have a larger diameter of 26 millimeters and a circumference of 81.7 millimeters with one millimeter teeth the ratchet wheel will have about 81 teeth. The adjustment increment then is 0.33 mm.

$$\frac{26.6}{81} = 0.33 \text{ mm}$$

By such an arrangement, the teeth can be made larger and still obtain a small increment of adjustment while withstanding greater compression loads or shearing loads on the teeth as might occur in a cable control system.

In other words for the same adjustment increment, the teeth can be made larger, about three times larger in the above example, and therefore would be stronger.

In the form of device shown in FIGS. 5-9, the housing is hollow. The combined ratchet end pinion gear 17a is inserted in the housing and is pivoted by having the bosses 22a, 23a thereof extend into slots 40a, 40b. A pivoted cover 42 is connected by an integral hinge 43 and supports lock or ratchet tooth 44 that is adapted to engage between teeth of the conduit member 33a. The cover 42 includes an integral latch 45 integrally formed thereon and adapted to engage under a ledge 46 on the housing 16a. In this form, the ratchet 45 is fixed. A spring 31 is interposed between the housing 16a and the flange member 32 so that when the cover is pivoted to the position shown in FIG. 9, the member 33 is moved axially to take up any slack by moving the conduit and in turn applying tension on the strand 12. Such an arrangement is shown diagramatically in FIG. 5.

In each of the forms, the housing may be provided with integrally formed wings 50 for mounting the device on a wall W in the vehicle or the like as is well know in the art.

In the form shown in FIGS. 10 and 11, the teeth 36c on the member 33b are annular. In addition, integral fingers 33c extend radially outwardly to resist any tendency of the spring 31 from pushing the housing 16a off of the annular groove rack 33b facilitating assembly in lieu of a flange 33a as shown in FIG. 6.

It can thus be seen that there has been provided a cable control system incorporating a device which will produce substantially smaller adjustments while the teeth are large enough to be accurately molded; wherein the device will withstand higher compression loads because the teeth are larger; and which can be automatically or manually controlled.

We claim:

1. A cable control system including an adjustment device comprising
   a housing,
   a conduit fitting having teeth thereon mounted for reciprocating movement within said housing and adapted to be connected to the conduit of a cable system through which a cable strand extends,
   a ratchet gear rotatably mounted in the housing and supporting a pinion gear which engages teeth on the conduit fitting member,
   said ratchet gear having gear teeth with a pitch diameter greater than the pitch diameter of the teeth on the pinion gear and the teeth on the pinion gear being larger than the teeth on the ratchet wheel so that there are a greater number of teeth on the ratchet wheel than on the pinon, and
   a retractable ratchet detent engaging the teeth on the ratchet wheel.

2. The cable control system set forth in claim 1 wherein said housing includes a cover supporting said ratchet detent.

3. The cable control system set forth in claim 2 wherein said cover is bodily removable.

4. The cable control system set forth in claim 2 wherein said cover is pivotally connected to said housing by an integral hinge.

5. The cable control system set forth in claim 1 wherein said ratchet gear and pinion gear comprise a single body.

6. The cable control system set forth in claim 1 wherein said conduit fitting has longitudinally spaced teeth.

7. The cable control system set forth in claim 6 wherein said teeth are annular.

8. The cable control system set forth in claim 1 including integral means on said housing adapted to hold said housing on a wall or the like.

9. The cable control system set forth in any of claims 1-8 wherein said ratchet detent is yieldingly urged against said ratchet wheel such that the device operates automatically.

10. The cable control system set forth in any of claims 1-8 wherein said ratchet device is rigid and must be manually moved out of engagement with the teeth, said device including a spring yieldingly urging the device in one direction such that when the ratchet device is moved out of engagement with the teeth, the spring functions to move the conduit away from the housing.

* * * * *